(12) United States Patent
Jitaru

(10) Patent No.: US 7,012,820 B2
(45) Date of Patent: Mar. 14, 2006

(54) FORWARD CONVERTER WITH CONTROLLED RESET

(75) Inventor: Ionel D. Jitaru, Tucson, AZ (US)

(73) Assignee: DET International Holding Limited, (KY)

( * ) Notice: Subject to any disclaimer, the term of this patent is extended or adjusted under 35 U.S.C. 154(b) by 0 days.

(21) Appl. No.: 10/499,850

(22) PCT Filed: Dec. 20, 2002

(86) PCT No.: PCT/CH02/00719

§ 371 (c)(1),
(2), (4) Date: Feb. 9, 2005

(87) PCT Pub. No.: WO03/055051

PCT Pub. Date: Jul. 3, 2003

(65) Prior Publication Data

US 2005/0128774 A1    Jun. 16, 2005

Related U.S. Application Data

(60) Provisional application No. 60/342,314, filed on Dec. 21, 2001.

(51) Int. Cl.
*H02M 3/335* (2006.01)
(52) U.S. Cl. .................................. 363/21.04
(58) Field of Classification Search ............. 363/21.04, 363/21.08, 49, 55, 56.01, 56.12
See application file for complete search history.

(56) References Cited

U.S. PATENT DOCUMENTS

| | | | |
|---|---|---|---|
| 4,870,554 A | 9/1989 | Smith | |
| 5,126,931 A | 6/1992 | Jitaru | |
| 5,231,563 A | 7/1993 | Jitaru | |
| 5,434,768 A | 7/1995 | Jitaru et al. | |
| 5,443,534 A * | 8/1995 | Vinciarelli et al. | ........... 29/593 |
| 5,880,943 A | 3/1999 | Yokoyama | |
| 6,011,702 A | 1/2000 | Gucyski | |
| 6,046,918 A | 4/2000 | Jitaru | |
| 6,469,486 B1 | 10/2002 | Jitaru | |
| 6,639,814 B1 * | 10/2003 | Gan et al. | ..................... 363/25 |

FOREIGN PATENT DOCUMENTS

WO    WO 00/21176    4/2000

* cited by examiner

*Primary Examiner*—Adolf Berhane
(74) *Attorney, Agent, or Firm*—Gallagher & Kennedy, P.A.; Thomas D. MacBlain

(57) ABSTRACT

A power device such as a forward converter employing a main switch in series with a power transformer coupling an input, primary circuit and an output, secondary circuit has its transformer reset from a reset capacitor that is switched. Switching of the reset capacitor is effected by a reset switch, preferably a MOSFET, the control electrode of which is driven from a reset winding on the power transformer. Current flow between the reset capacitor and the primary winding resets the transformer. The capacitor can be chosen such that flux density in the transformer core is substantially symmetrical about zero. Leakage and magnetizing conductance energy is recycled. Large spikes are not produced across the main switch.

16 Claims, 4 Drawing Sheets

FORWARD CONVERTER WITH CONTROLLED RESET

CROSS REFERENCE TO RELATED APPLICATIONS

Priority is claimed from U.S. provisional patent application Ser. No. 60/342,314 of Ionel D. Jitaru filed Dec. 21, 2001 entitled "A Forward Converter with Controlled Reset." That application is incorporated herein by reference in its entirety.

TECHNICAL FIELD

This invention relates to transformer reset provisions for a power device and more particularly to a controlled reset for a forward converter using a switched reset capacitance.

PRIOR ART

A forward converter typically has a main switch in the primary circuit of a power transformer coupling the input, primary circuit and secondary, output circuit. The resetting of the transformer of a forward converter in the prior art is done in several different ways:

1. The Third Wire Reset

In this technique, a reset winding well coupled with the primary winding of the forward converter's power transformer is used to reset the transformer. The turn ratio between the reset winding and the primary winding will determine the reset voltage. If the turn ratio is 1, then the reset voltage is equal to the primary voltage. Drawbacks of this concept are:
   a. If leakage inductance energy is not recycled, the result may be voltage spikes across the main switch at each turn off.
   b. The need for the reset winding well coupled with the primary complicates the transformer.
   c. The flux density through the power transformer's magnetic core is not symmetrical to zero. This leads to a poor utilization of the magnetic core.

2. The Reset Using RCD

This technique uses a diode and a clamp circuit formed by a resistor and a capacitor in parallel. The magnetizing current and the leakage current will charge the capacitor to a given level. During the on time of the main switch, the resistor in parallel with it will discharge the capacitor. Drawbacks of this concept are:
   a. The energy associated with the leakage and magnetizing current is dissipated.
   b. Fast variation of the duty cycle with Vin will lead to a flux swing in the transformer that can reach saturation.

3. The Resonant Reset

The primary winding of the power transformer resonates with the parasitic capacitance of the main switch, typically a semiconductor switch. An additional reset capacitor may be necessary to control reset. Drawbacks of this concept are:
   a. There is high voltage stress on the main switch.
   b. Fast variation of the duty cycle and Vin will further lead to high voltage stress on the main switch.
   c. The turn on switching losses will increase due to the full discharge of the reset capacitor on the main switch.

4. The Optimum Reset Using Active Clamp

An additional switch in series with a reset capacitor is placed in parallel to the main switch or in parallel with the primary winding. It is activated (i.e. closed or placed in conduction) during the off time of the main switch. The optimum reset has quite a few advantages in comparison with the traditional reset, such as:
   a. The voltage across the switch is minimized.
   b. The duty cycle can be larger than 50%.
   c. The leakage and magnetizing energy is recycled.
   d. The flux swing in the transformer is symmetrical to zero.

There are also disadvantages:
   a. During transients (load or line) the voltage across the reset capacitor can reach very high levels, at the same time the flux can reach high levels. The net result, it is not a good topology for fast dynamic response.
   b. The primary inductance and the reset capacitor form a resonant circuit, which will oscillate during transients.
   c. The complexity of driving the reset switch (a MOSFET switch, for example) with just the right timing.

There is a need, therefore, of a transformer reset for a power device such as a forward converter in which a main switch opens and closes in a current path to the primary of a power transformer such that reset voltage that is constant is applied to the power transformer primary. Application of the reset voltage should be easily controlled and can be set depending upon the application of the power device. It would be advantageous if the leakage and magnetizing inductance energy of the power transformer were recycled, and without spikes across the main switch. Preferably, the flux through the power transformer should be symmetrical to zero, with the result that the BH curve is better utilized. The reset circuit should be simple, requiring no additional driving and timing circuit for the reset switch or reset FET.

SUMMARY OF THE INVENTION

In accordance with one exemplary embodiment of the invention, a forward converter is provided that has a power transformer, an input circuit connected to a primary winding of the power transformer, an output circuit connected to a secondary winding of the power transformer and a transformer reset winding of the power transformer, a main switch coupled in switching relation to the primary winding and a transformer reset capacitor connected in current conducting relating to the primary winding, wherein the improvement comprises an electrically controlled reset switch coupled in switching relation in a current path from the primary winding to the reset capacitor, and the reset winding is coupling in electrically controlling relation to the reset switch. In the specific preferred and exemplary embodiment described herein, the reset switch is a semiconductor switch having a control electrode, or in the case of a MOSFET, a gate driven directly by the reset winding of the transformer.

The control of the reset switch is readily accomplished, in the case of the preferred and exemplary embodiment, by a simple voltage divider coupling the reset winding to the control electrode of the semiconductor switching device serving as the reset switch. By choosing the appropriate reset capacitor value, the flux in the power transformer is substantially symmetrical about zero. In this way the BH curve of the transformer is well utilized. In the exemplary preferred embodiment described below, the inventive device is broadly a power device having a power transformer and a reset capacitive element that releases energy to a first winding of the power transformer to reset the power transformer. Under the control of a reset switching means such as a semiconductor switching device that connects the reset capacitive element in current conducting relation to the first winding, the switching device is itself under the control of a reset winding and means that connects the reset winding to the reset switching means. The opening and closing of the reset switching means under the control of the reset winding causes transformer-resetting current flow between the reset capacitive element and the first winding of the power transformer. In this way, the leakage and magnetizing inductance energy in the transformer is recycled and spiking across the main switch is avoided. Again, current from the reset winding through a pair of resistors forming a voltage divider permits the control of the reset switch through choice of the ratio of the voltage divider resistors. In this specific preferred embodiment, the reset winding activates the reset switching means upon the collapse of a magnetic field in the core of the power transformer.

In accordance with the preferred embodiment of the invention the reset voltage is constant. It is easily controlled, e.g. by the likes of the simple divider described, and the reset voltage can be set to accommodate the desired function of the power device. Additional driving and timing circuits for the switch or FET are not required. Leakage and magnetizing inductance energy is recycled. Spikes across the main switch are avoided. During transients the duty cycle can increase without increasing the voltage stress on the main switch. The reset voltage can be also adjusted as a function of the input to maximize the performances and minimize the stress.

The above and further objects and advantages of the invention will be better understood from the following detailed description of at least one preferred embodiment of the invention, taken in consideration with the accompanying drawings.

SHORT DESCRIPTION OF THE DRAWINGS

WAYS OF CARRYING OUT THE INVENTION

Figure 1:
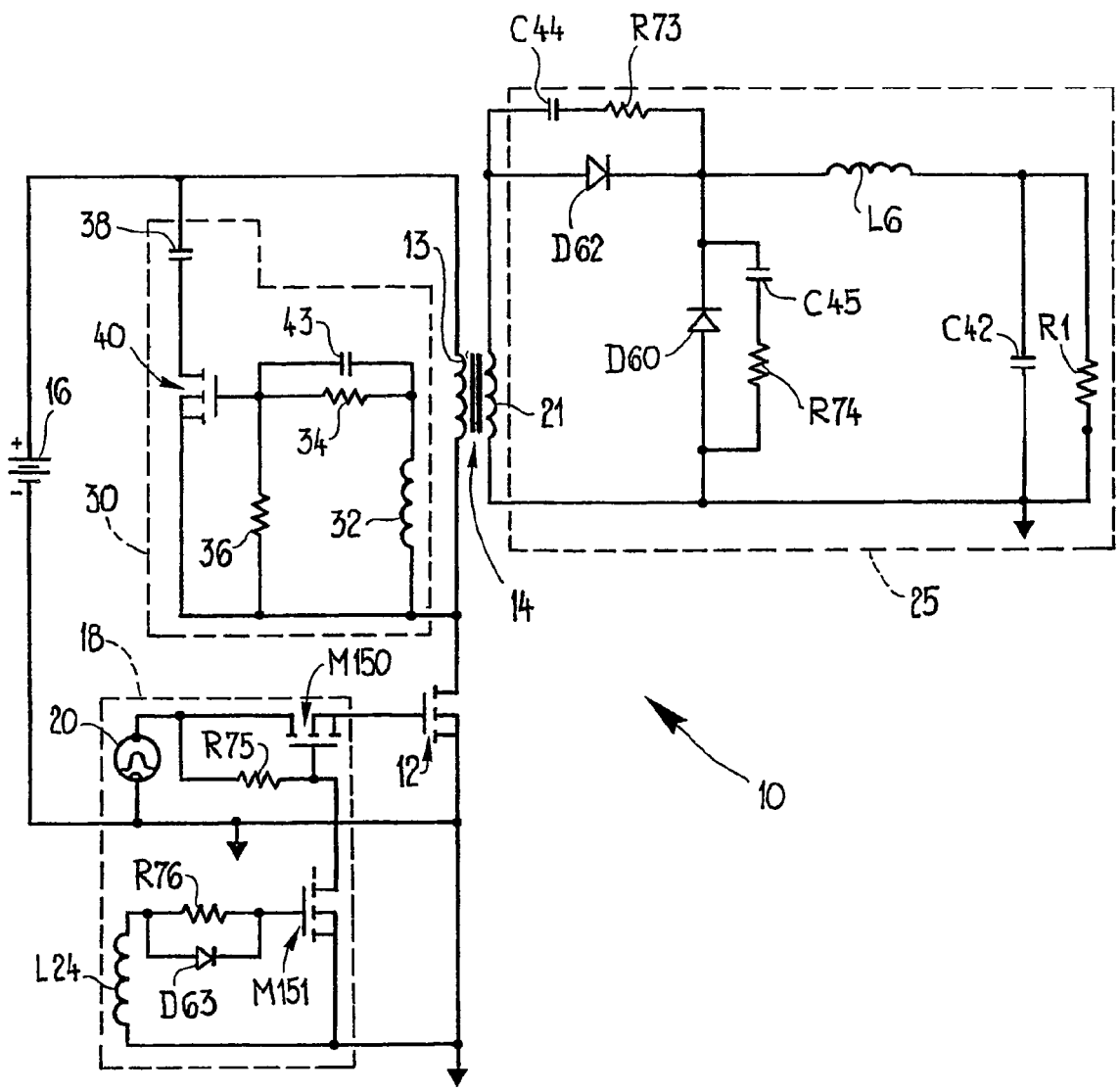
FIG. 1 is a schematic diagram of a circuit of a forward converter and shows a MOSFET switch controlled from a reset winding of a transformer to open and close a current path between a reset capacitor and the primary winding of the transformer.

Turning to FIG. 1, there is shown a forward converter 10 in which a main switch 12 is connected in series with a primary winding 13 of a power transformer 14 and a DC voltage source 16. Opening and closing of the main switch 12, a MOSFET device, is controlled by a switching circuit 18 coupled to the gate of the MOSFET switch. A voltage 20 supplies the input to the control circuit 18. The main switch, MOSFET 12, is opened and closed to interrupt and supply current through the primary winding 13 to generate a voltage across the secondary winding 21 of the power transformer 14. This is applied to a secondary or output circuit 25. The output of the forward converter 10 is applied across a load represented in. FIG. 1 by the resistance R1.

A reset circuit 30 includes a reset winding 32 wound on the core of the power transformer 14. Across the reset winding 32 a pair of resistors 34 and 36 form a voltage divider. A reset capacitor 38 is connected in series with a reset switch or MOSFET device 40. A bypass capacitor 43 is connected in parallel with the resistor 34 of the voltage divider. The values of the circuit components throughout FIG. 1 are set forth in Table 1. The control signal that activates the reset MOSFET 40 is applied to, that MOSFET's gate from the junction of the voltage divider resistors 34 and 36. The main switch control circuit 18 and the secondary or output circuit 25 may be as shown or as in other, prior art forward converters and are not further described here, as they do not form a part of the present invention.

TABLE 1

| Component | Value |
| --- | --- |
| Main switch 12 | 1RF640 |
| Primary winding 13 | 248 $\mu$H |
| DC voltage source 16 | 35 V |
| Secondary winding 21 | 3.87 $\mu$H |
| Reset winding 32 | 0.96 $\mu$H |
| Resistor 34 | 200 $\Omega$ |
| Resistor 36 | 900 $\Omega$ |
| Capacitor 38 | 0.03 $\mu$f |
| Reset MOSFET 40 | 2N7000 |
| Capacitor 43 | 330 pF |
| MOSFET M150 | 2N7000 |
| Resistor R75 | 1 k$\Omega$ |
| MOSFET M15 | 2N7000 |
| Resistor R76 | 2 k$\Omega$ |
| Diode D63 | D1N 914 |
| Inductor L24 | 3.87 $\mu$H |
| Secondary winding L3 | 3.87 $\mu$H |
| Capacitor C44 | 3300 pF |
| Resistor R73 | 10 $\Omega$ |
| Diode D62 | MBR 1035 |
| Resistor R74 | 10 $\Omega$ |
| Capacitor C45 | 3300 pF |
| Diode D60 | MBR 1035 |
| Inductor L6 | 0.8 $\mu$H |
| Capacitor C42 | 50 $\mu$f |
| Resistor R1 | Load |

In operation, the topology of the specific exemplary preferred embodiment of FIG. 1 combines some of the advantages of the active clamp reset and the third wire reset described above. It comprises the additional MOSFET 40 driven directly from the transformer 14. The additional MOSFET 40 in series with the reset capacitor 38 is switched on and off to enable reset energy to flow between the reset capacitor 38 and the primary winding of the transformer 14. The reset voltage is constant and depends on the turn ratio between the reset winding 32 and the primary winding 13. The reset voltage is also a function of the threshold that turns off the reset switch 40.

Figure 2:
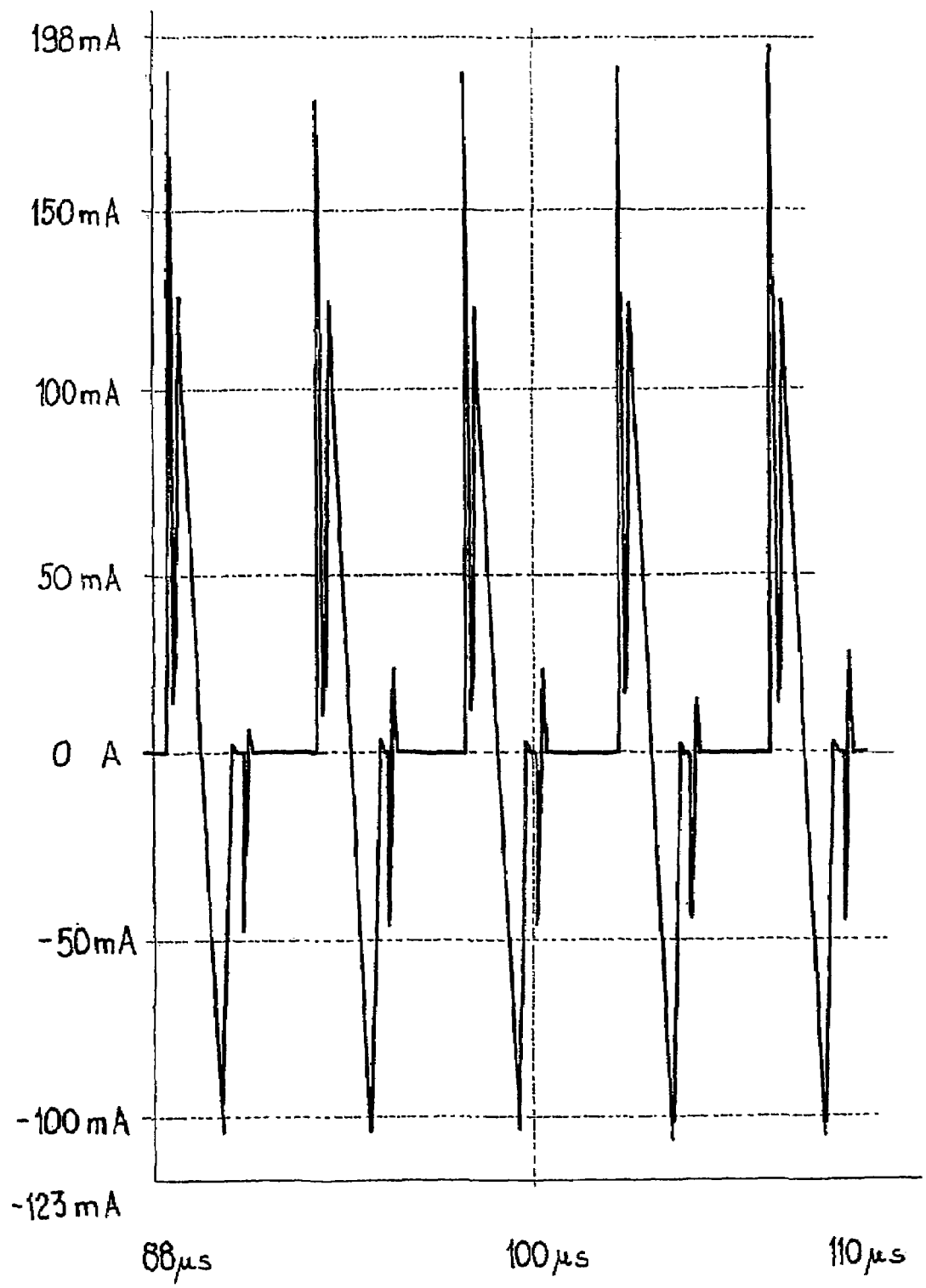
FIG. 2 is a plot against time of the current through the reset switch of the circuit of FIG. 1.
Figure 3:
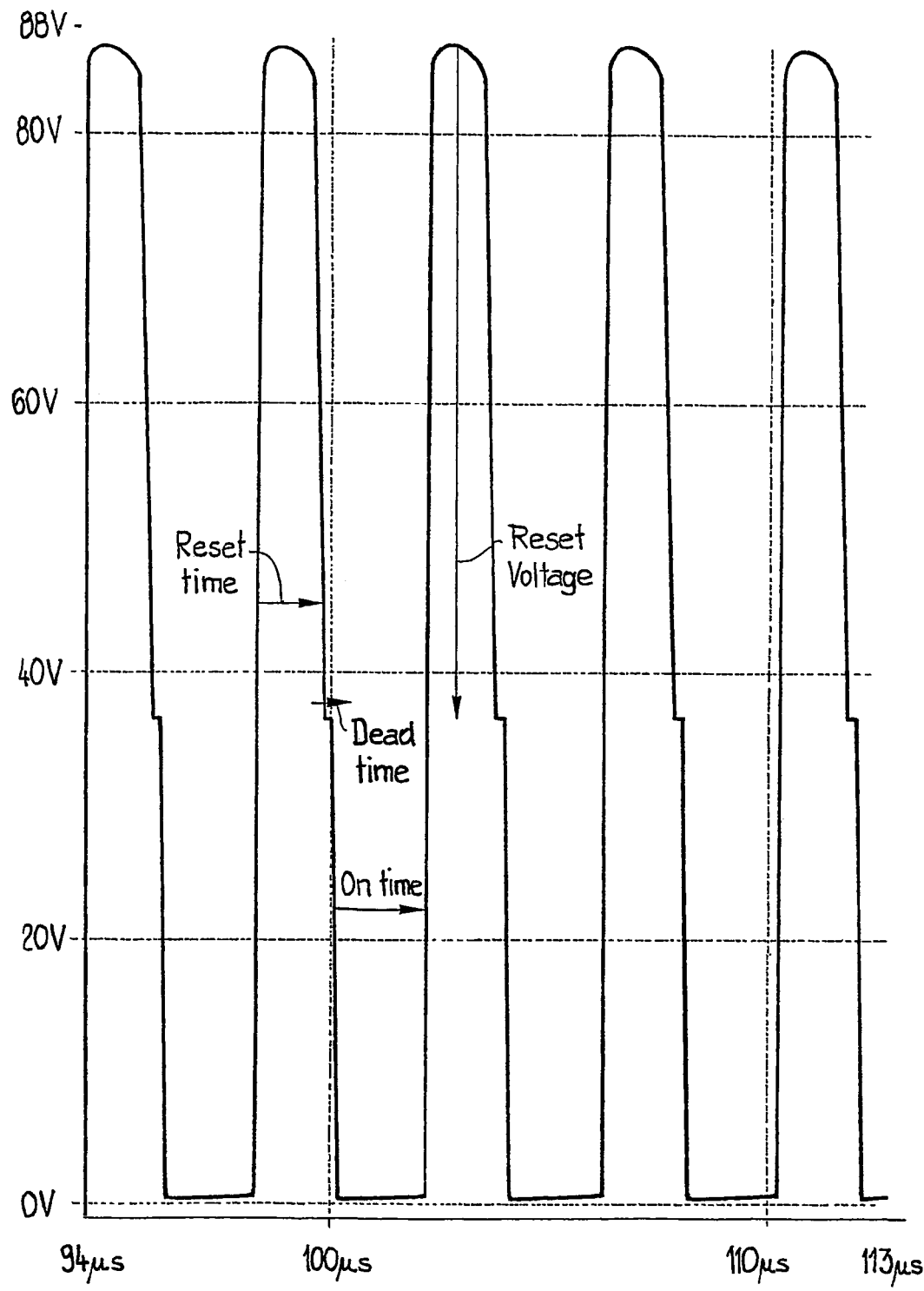
FIG. 3 is a plot against time of the voltage across the main switch of the circuit of FIG. 1.
Figure 4:
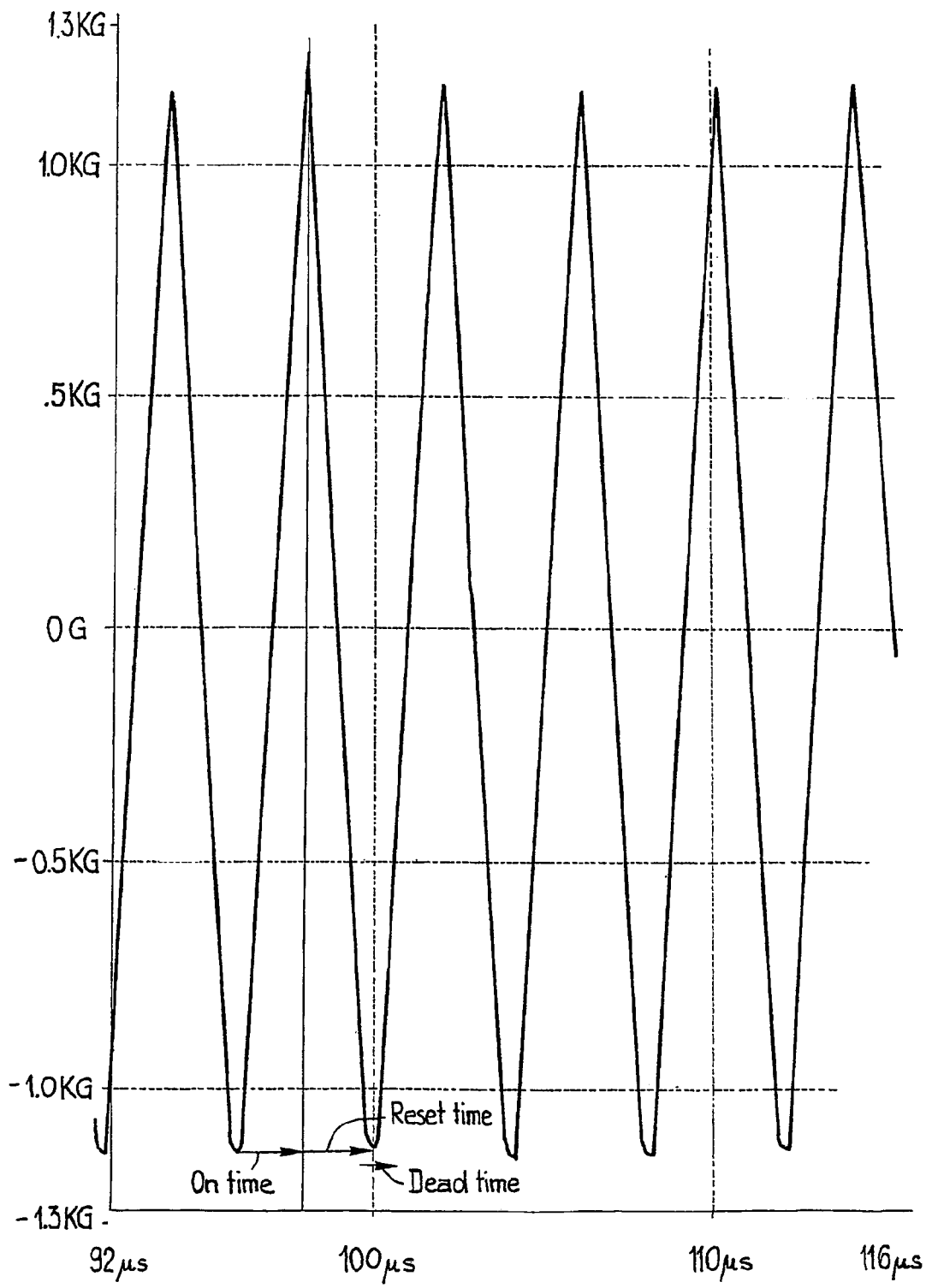
FIG. 4 is a plot illustrating the symmetrical flux density in the core of the power transformer of the circuit of FIG. 1.

Current through the reset switch is illustrated in FIG. 2. In FIG. 3, the voltage across the main switch with time is plotted. The reset time is shown at 45 and the reset voltage is shown at 47. In FIG. 4 the flux density through the transformer is illustrated and can be seen to be substantially symmetrical about zero.

Although a preferred embodiment of the invention has been described in detail, it will be readily appreciated by those skilled in the art that further modifications, alterations and additions to the invention embodiments disclosed may be made without departure from the spirit and scope of the invention as set forth in the appended claims. For example, the main switch and reset switches are shown in the preferred exemplary embodiment as MOSFET devices, but they may be other semiconductor switches as desired. While a simple voltage divider is used to apply the control voltage to the MOSFET switch in the exemplary embodiment described, more complex circuits can be employed as equivalent means for doing this without departure from the invention. The voltages, times, and circuit element values are given as exemplary only and may be varied as desired, depending on the application to which this power device is to be applied.

I claim:

1. In a forward converter having a power transformer, an input circuit connected to a primary winding of the power transformer, an output circuit connected to a secondary winding of the power transformer and a transformer reset winding of the power transformer, a main switch coupled in switching relation to the primary winding, a transformer reset capacitor connected in current conducting relation to the primary winding, an electrically controlled reset switch coupled in switching relation in a current path from the primary winding to the reset capacitor, and the reset winding being coupled in electrically controlling relation to the reset switch, wherein the forward converter has a substantially constant reset voltage.

2. The forward converter of claim 1, wherein the reset switch is a semiconductor switch having a control electrode coupled to the reset winding.

3. The forward converter of claim 2, wherein the semiconductor switch is a MOSFET switch having its gate coupled to the reset winding.

4. The forward converter of claim 2, further comprising a voltage divider coupling the control electrode to the reset winding.

5. The forward converter of claim 3, further comprising a voltage divider coupling the MOSFET switch's gate to the reset winding.

6. The forward converter of claim 1, wherein the reset capacitor has a value such that the flux in the power transformer is substantially symmetrical about zero.

7. In a power device having a power transformer,
   a) a reset capacitive element to release energy to a first winding of the power transformer to reset the power transformer;
   b) reset switching means for coupling the reset capacitive element in current conducting relation to the first winding;
   c) a reset winding on the transformer; and
   d) means connecting the reset winding to the reset switching means for electrically controlling the opening and closing of the reset switching means to cause transformer resetting current flow between the reset capacitive element and the first winding of the power transformer.

8. The power device according to claim 7, wherein the means connecting the reset winding to the reset switching device includes a current path through a pair of resistors forming a voltage divider.

9. The power device according to claim 7, wherein the reset switching means comprises a semiconductor switching device having a control electrode coupled to the reset winding.

10. The power device according to claim 8, wherein the reset switching means comprises a semiconductor switching device having a control electrode coupled to a point of connection between the resistors of the voltage divider.

11. The power device according to claim 7, wherein the power transformer has a magnetic core, the reset winding is wound on the magnetic core to produce a switch activating signal.

12. A reset circuit for a power device having a power transformer connected between input and output circuits; the reset circuit being coupled to a primary winding of the transformer, and comprising:
   a) an electrically controlled reset switch,
   b) a reset winding on the power transformer connected in controlling relation to the electrically controlled switch, and
   c) a reset capacitor connected in a current path through the electrically controlled switch to the primary winding; whereby the reset switch is operated by a control signal derived from the reset winding to complete the current path between the capacitor and the primary winding causing the transfer of transformer resetting energy between the capacitor and the primary winding, wherein the reset circuit has a constant reset voltage.

13. The power device according to claim 7, wherein the reset capacitive element and reset switching means provide a substantially constant reset voltage to the first winding.

14. In a forward converter having a power transformer, an input circuit connected to a primary winding of the power transformer, an output circuit connected to a secondary winding of the power transformer and a transformer reset winding of the power transformer, a main switch coupled in switching relation to the primary winding, a transformer reset capacitor connected in current conducting relation to the primary winding, an electrically controlled reset switch coupled in switching relation in a current path from the primary winding to the reset capacitor, and the reset winding is coupled in electrically controlling relation to the reset switch;
   wherein the reset switch is a semiconductor switch having a control electrode coupled to the reset winding via a voltage divider.

15. In a forward converter having a power transformer, an input circuit connected to a primary winding of the power transformer, an output circuit connected to a secondary winding of the power transformer and a transformer reset winding of the power transformer, a main switch coupled in switching relation to the primary winding and a transformer reset capacitor connected in current conducting relation to the primary winding, an electrically controlled reset switch is coupled in switching relation in a current path from the primary winding to the reset capacitor, and the reset winding being coupled in electrically controlling relation to the reset switch;
   wherein the reset switch is a MOSFET semiconductor switch having a gate coupled to the reset winding via a voltage divider.

16. The power device according to claim 15, wherein the reset switching means comprises a semiconductor switching device having a control electrode coupled to a point of connection between the resistors of the voltage divider.

* * * * *